(12) United States Patent
Li et al.

(10) Patent No.: US 9,868,114 B2
(45) Date of Patent: Jan. 16, 2018

(54) PREPARATION METHOD OF FLUORINE-DOPED LAMELLAR BLACK TITANIUM DIOXIDE NANO MATERIAL

(71) Applicant: NORTH CHINA ELECTRIC POWER UNIVERSITY, Beijing (CN)

(72) Inventors: Meicheng Li, Beijing (CN); Jiewei Chen, Beijing (CN); Yancong He, Beijing (CN); Bixia Xie, Beijing (CN); Wenjian Liu, Beijing (CN); Ruike Li, Beijing (CN)

(73) Assignee: North China Electric Power University, Beijing (CN)

( * ) Notice: Subject to any disclaimer, the term of this patent is extended or adjusted under 35 U.S.C. 154(b) by 14 days.

(21) Appl. No.: 15/208,180

(22) Filed: Jul. 12, 2016

(65) Prior Publication Data

US 2017/0014811 A1 Jan. 19, 2017

(30) Foreign Application Priority Data

Jul. 13, 2015 (CN) .......................... 2015 1 0404601

(51) Int. Cl.
*B01J 27/00* (2006.01)
*B01J 27/135* (2006.01)
*B01J 35/00* (2006.01)
*B01J 37/06* (2006.01)
*B01J 37/08* (2006.01)
(Continued)

(52) U.S. Cl.
CPC .......... *B01J 27/135* (2013.01); *B01J 35/002* (2013.01); *B01J 35/004* (2013.01); *B01J 35/0013* (2013.01); *B01J 37/031* (2013.01); *B01J 37/06* (2013.01); *B01J 37/08* (2013.01); *C01G 23/053* (2013.01); *C09C 1/3653* (2013.01); *H01G 9/2031* (2013.01); *C01P 2002/54* (2013.01); *C01P 2002/85* (2013.01);
(Continued)

(58) Field of Classification Search
CPC ..................................................... B01J 27/135
See application file for complete search history.

(56) References Cited

U.S. PATENT DOCUMENTS

| 5,143,668 A | * | 9/1992 | Hida | ..................... C04B 35/803 |
| | | | | 264/649 |
| 2010/0304236 A1 | * | 12/2010 | Ying | ..................... B01J 23/002 |
| | | | | 429/423 |
| 2011/0189081 A1 | * | 8/2011 | Lu | ........................ C01G 23/047 |
| | | | | 423/612 |

OTHER PUBLICATIONS

Lv et al, Effect of calcination temperature on morphology and photocatalytic activity of anatase TiO 2 nanosheets with exposed {0 0 1} facets, 2011, Applied Catalysis B Environmental, pp. 275-281.*

* cited by examiner

*Primary Examiner* — Melvin C Mayes
*Assistant Examiner* — Stefanie Cohen
(74) *Attorney, Agent, or Firm* — Andrew W. Chu; Craft Chu PLLC

(57) ABSTRACT

The method for preparing fluorine-doped lamellar black $TiO_2$ nanomaterials includes mixing a solution of tetra-n-butyl titanate, n-propanol and hydrofluoric acid together, and then stir the solutions for a period of time. The solution is transferred into an autoclave and reacts at a certain temperature for a period of time. The sample obtained by the reaction is washed and dried. Then, the sample is heated in a protective atmosphere for a period of time so as to produce the fluorine-doped lamellar black $TiO_2$ nanomaterials. This fluorine-doped lamellar black $TiO_2$ owns superior optical absorption and electron transport performances.

3 Claims, 3 Drawing Sheets

(51) Int. Cl.
    *H01G 9/20*       (2006.01)
    *B01J 37/03*      (2006.01)
    *C01G 23/053*    (2006.01)
    *C09C 1/36*      (2006.01)

(52) U.S. Cl.
    CPC ...... *C01P 2004/64* (2013.01); *C01P 2004/84* (2013.01); *Y02E 10/542* (2013.01)

PREPARATION METHOD OF FLUORINE-DOPED LAMELLAR BLACK TITANIUM DIOXIDE NANO MATERIAL

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the technical field of nano materials and, more specifically, to a method for preparing a fluorine-doped lamellar black titanium dioxide nano material. This nano material owns the advantages of both superior optical absorption and electrochemical performance, so it can be used as a catalyst for photocatalysis application, as well as a photoanode material in dye-sensitized solar cells.

2. Description of Related Art Including Information Disclosed Under 37 CFR 1.97 and 37 CFR 1.98.

Titanium dioxide ($TiO_2$) is an environmentally friendly, chemically stable and low-cost semiconductor material widely used in many fields including photoelectrochemical catalysis, dye-sensitized solar cells, perovskite solar cells, and lithium-ion batteries owing to its excellent charge transport performance, high catalytic activity under light irradiation and other feature. However, common $TiO_2$ material possesses a distinct disadvantage of wide band gap (~3 eV), which may restricts its absorption in visible light region and carrier transport/separating ability. Therefore, modifying the electron energy level of $TiO_2$ to narrow the bandgap, and consequently enhance the light absorption and carrier transport/separation ability of $TiO_2$ is of great importance to its performance improvement. Herein, we have prepared a new-type fluorine-doped lamellar black $TiO_2$ nanomaterial by adopting a low-temperature hydrothermal synthesis method, which uses tetra-n-butyl titanate as the titanium source, n-propanol as the solvent and hydrofluoric acid as the surface agent. Specifically, trivalent titanium defects are generated in the black $TiO_2$ as a result of the fluorine doping, making the electron energy level structure improved to some extent. The black feature of the $TiO_2$ enables the absorption of more sunlight, and the lamellar-nanosheet structure benefits in increasing the specific surface area, thereby improving the photocatalytic performance of the material.

BRIEF SUMMARY OF THE INVENTION

The objective of this invention is to prepare a kind of fluorine-doped lamellar black $TiO_2$ nanomaterial by a simple one-step hydrothermal synthesis method with precursors of tetra-n-butyl titanate as the titanium source, n-propanol as the solvent and hydrofluoric acid as the surface agent. The specific preparation method includes the following steps:

(1) add 20~30 mL n-propanol into a beaker, then add 1~3 mL tetrabutyl titanate, and stir it well stir it well;

(2) add 0.2~0.8 mL hydrofluoric acid into the solution, and then stir the mixed solution for 1 to 3 hours;

(3) transfer the solution prepared to an autoclave, and leave it to have hydrothermal reaction at 160~200° C. for 12~24 hours;

(4) keep washing the precipitate obtained after reaction with deionized water and ethanol until the filtrate is neutral, and then dry it;

(5) calcine the dried precipitate at 400~450° C. in a protective atmosphere, thus the fluorine-doped lamellar black $TiO_2$ sample is obtained.

The n-propanol added in Step (1) is 20~30 mL, with tetra-n-butyl titanate of 1~3 mL.

The hydrofluoric acid added in Step (2) is 0.2~0.8 mL, with the stirring time of 1~3 hours.

The reaction temperature of the solution in the autoclave in Step (3) is 160~200° C., with the reaction time of 12~24 hours.

The drying temperature for the sample obtained in Step (4) is 50° C.~60° C., with the drying time of 12~20 hours.

The protective atmosphere used in Step (5) is a gas mixture of argon and hydrogen, with the calcination time of 2~4 hours.

The beneficial effects of the present invention: it uses tetra-n-butyl titanate as the titanium source, n-propanol as a solvent and hydrofluoric acid as a surface agent, adopting a simple one-step hydrothermal synthesis method, to prepare a fluorine-doped lamellar black $TiO_2$ nanomaterial. The advantages of the hydrothermal synthesis method: it can effectively conduct liquid phase control, and features lower energy consumption, good controllability and lower cost. The $TiO_2$ nanomaterial prepared via the method provided by the present invention possesses modified energy band structure by fluorine-doping, which greatly enhances its performance. Compared with the commercial-purpose P25, which only can absorb ultraviolet light, the synthesized $TiO_2$ nanomaterial has a relatively strong capacity of absorbing ultraviolet—visible—infrared light in full spectrum, which benefits the improvement in its photocatalytic performance. The material can be widely used in many fields including photoelectrochemistry, perovskite solar cells and dye-sensitized solar cells.

DETAILED DESCRIPTION OF THE INVENTION

Figure 1:
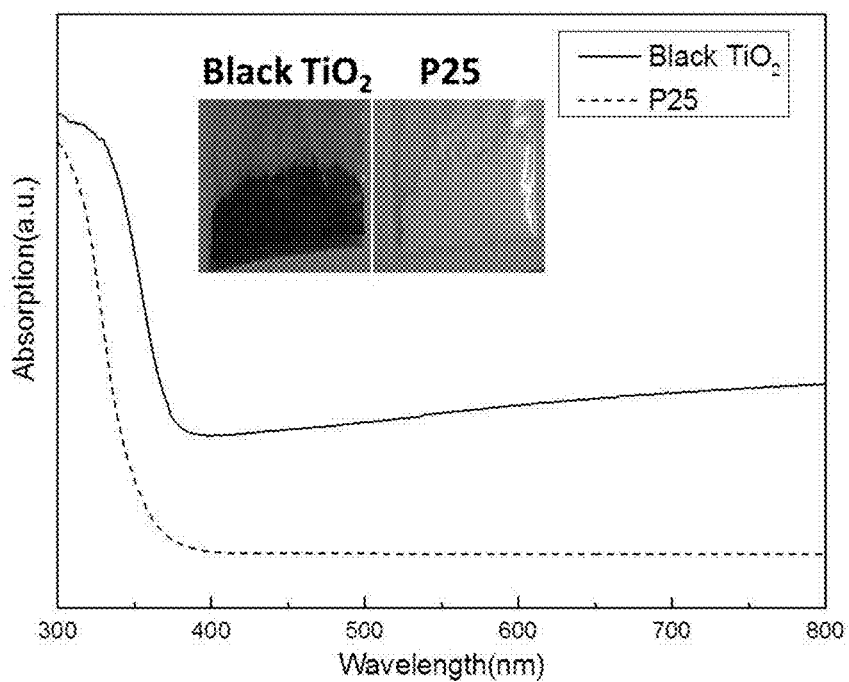
FIG. 1 is a contrast diagram of the absorption spectra between a fluorine-doped lamellar black $TiO_2$ nanomaterials prepared in Embodiment 1 of the present invention and the commercial P25 nanoparticles.
Figure 2:
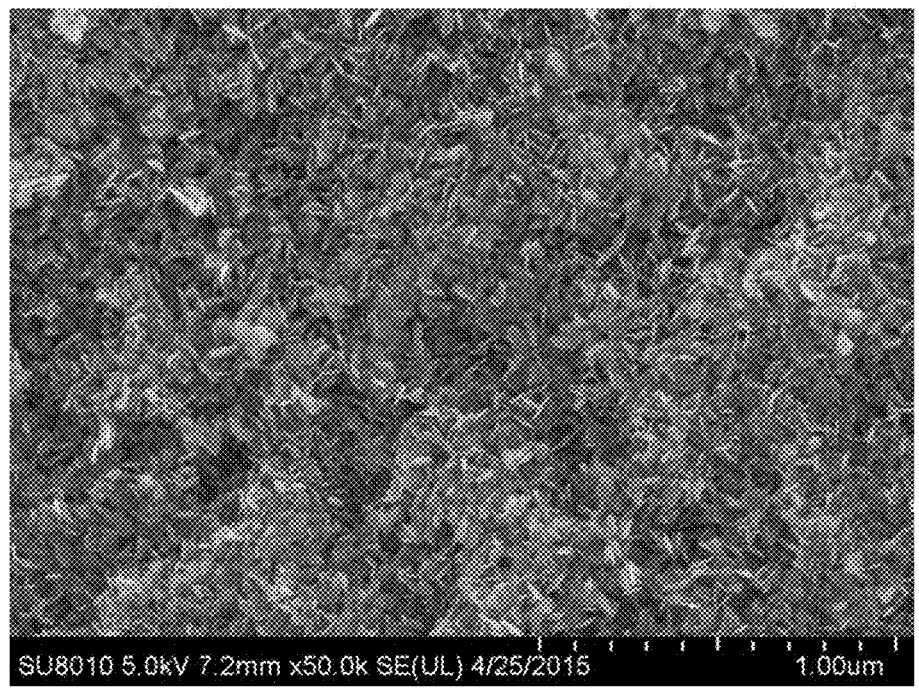
FIG. 2 is a scanning electron microscope (SEM) image of the fluorine-doped lamellar black $TiO_2$ nanomaterials prepared in Embodiment 1 of the present invention.
Figure 3:
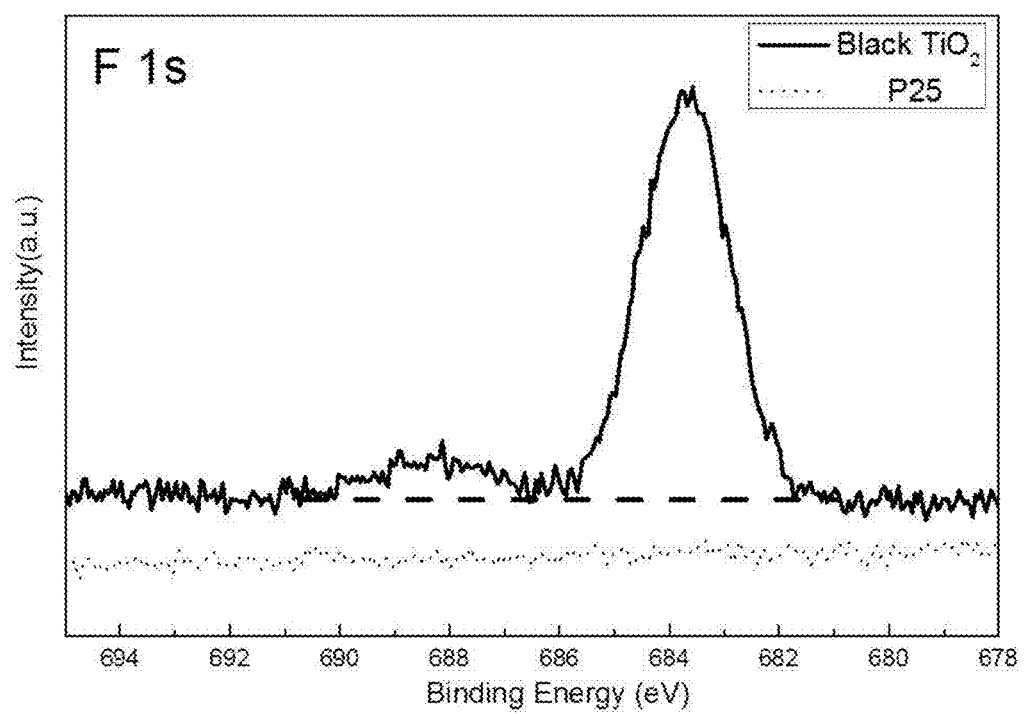
FIG. 3 is a contrast diagram of F1s signal in x-ray photo electron spectroscopy (XPS) between the fluorine-doped lamellar black $TiO_2$ nanomaterials prepared in Embodiment 1 of the present invention and the commercial P25 nanoparticles.

A method for preparing a pinecone-shaped $TiO_2$ nanomaterial provided by the present invention can be implemented as below, and the specific preparing method includes the following steps:

Embodiment 1

(1) add 25 mL of n-propanol into a beaker, then add 2 mL of tetrabutyl titanate, and stir it well;

(2) add 0.4 mL of hydrofluoric acid into the solution, and then stir it for 2 hours;

(3) transfer the solution prepared to an autoclave, and leave it to have hydrothermal reaction at 180° C. for 18 hours;

(4) wash the precipitate obtained after reaction with deionized water and ethanol, until the filtrate is neutral, and then dry it;

(5) calcine the sample obtained at 430° C. in a protective atmosphere to obtain the fluorine-doped lamellar black $TiO_2$ nanomaterials.

Embodiment 2

(1) add 20 mL of n-propanol into a beaker, then add 1 mL of tetrabutyl titanate, and stir it well;

(2) add 0.15 mL of hydrofluoric acid into the solution, and then stir it for 1 hour;

(3) transfer the solution prepared to an autoclave, and leave it to have hydrothermal reaction at 180° C. for 15 hours;

(4) wash the precipitate obtained after reaction with deionized water and ethanol, until the filtrate is neutral, and then dry it;

(5) calcine the sample obtained at 450° C. in a protective atmosphere to obtain the fluorine-doped lamellar black $TiO_2$ nanomaterials.

We claim:

1. A method for preparing a fluorine-doped lamellar black $TiO_2$ nanomaterials, the method comprising the steps of:
adding 20~30 mL of n-propanol into a beaker;
adding 1~3 mL of tetrabutyl titanate to said n-propanol so as to form a solution;
stirring said solution;
adding 0.2~0.8 mL of hydrofluoric acid into said solution so as to form another solution;
stirring said another solution for 1 to 3 hours;
transferring said another solution to an autoclave at 160~200° C. for 12~24 hours so as to form a precipitate by a hydrothermal reaction;
washing said precipitate with deionized water and ethanol so as to form a washed precipitate and a filtrate, until the filtrate is neutral;
drying said washed precipitate so as to form a sample; and
calcining said sample at 400~450° C. in a protective atmosphere for a period of time so as to form the fluorine-doped lamellar black $TiO_2$ nanomaterials with light absorption determined by both $Ti^{3+}_{surf}$ and $Ti^{3+}_{sub\text{-}surf}$ defects.

2. The method for preparing a fluorine-doped lamellar black $TiO_2$ nanomaterials as claimed in claim 1, wherein the step of drying said washed precipitate is at 50~60° C. for 12~20 hours.

3. The method for preparing a fluorine-doped lamellar black $TiO_2$ nanomaterials as claimed in claim 1, wherein the step of calcining said sample is 2-4 hours, said protective atmosphere being comprised of a gas mixture of argon and hydrogen.

* * * * *